Oct. 7, 1952 S. F. BRADFORD 2,613,006
SHOVEL ATTACHMENT FOR CRAWLER TRACTORS
Filed Aug. 20, 1949 3 Sheets-Sheet 1
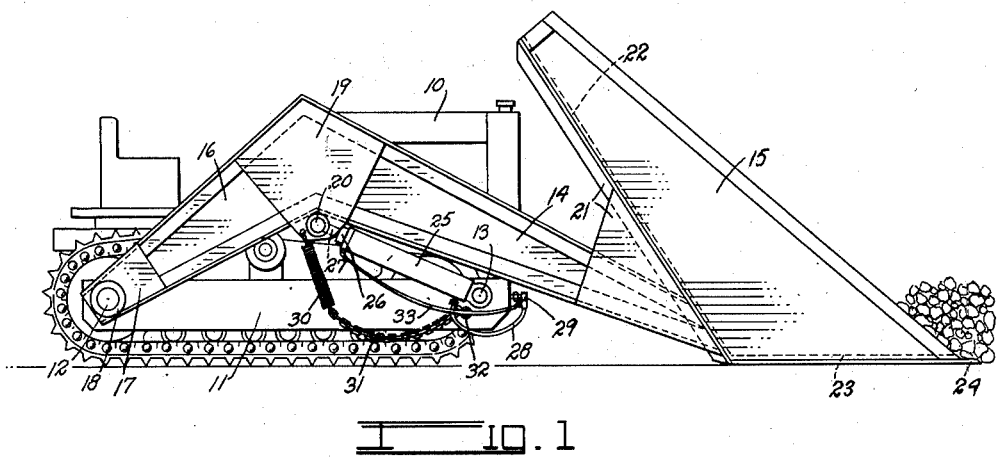
FIG. 1
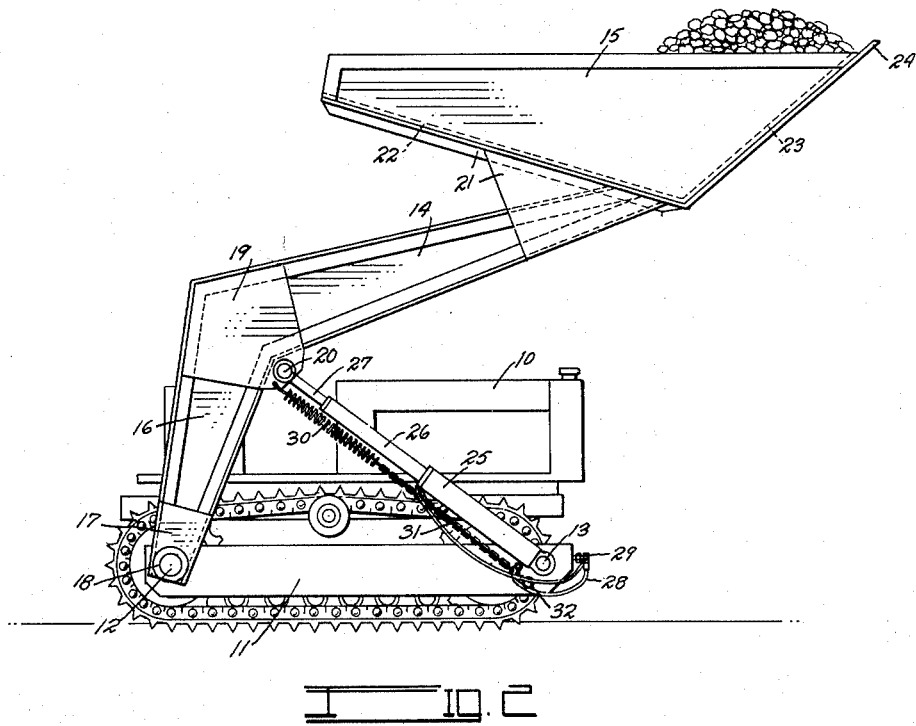
FIG. 2
INVENTOR.
SHIRRELL F. BRADFORD
BY
ATTORNEY Oct. 7, 1952     S. F. BRADFORD     2,613,006
SHOVEL ATTACHMENT FOR CRAWLER TRACTORS Filed Aug. 20, 1949     3 Sheets-Sheet 2

INVENTOR.
SHIRRELL F. BRADFORD
BY

ATTORNEY

Oct. 7, 1952 S. F. BRADFORD 2,613,006
SHOVEL ATTACHMENT FOR CRAWLER TRACTORS
Filed Aug. 20, 1949 3 Sheets-Sheet 3

INVENTOR.
SHIRRELL F. BRADFORD
BY
ATTORNEY

Patented Oct. 7, 1952

2,613,006

UNITED STATES PATENT OFFICE 2,613,006

SHOVEL ATTACHMENT FOR CRAWLER TRACTORS

Shirrell F. Bradford, Longmont, Colo.

Application August 20, 1949, Serial No. 111,469

1 Claim. (Cl. 214—131)

This invention relates to a shovel attachment for tractors, and while more particularly designed for tractors of the Caterpillar type, the invention can be applied to any suitable type of tractor.

The principal object of the invention is to provide a simple, sturdy, highly efficient, hydraulically operated mechanism whereby a shovel can be loaded by simply driving the tractor into the pile of material, and which will elevate the shovel and discharge the contents into a truck at the opposite extremity of the tractor.

Another object of the invention is to provide a device of this character which will have a minimum of operating parts, and which will eliminate the cables, sheaves and tracks usually employed in a shovel of this character.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved shovel in the loading position and in place on a conventional "Caterpillar" tractor;

Fig. 2 is a similar view, illustrating the shovel in the load-carrying position;

Figure 3:
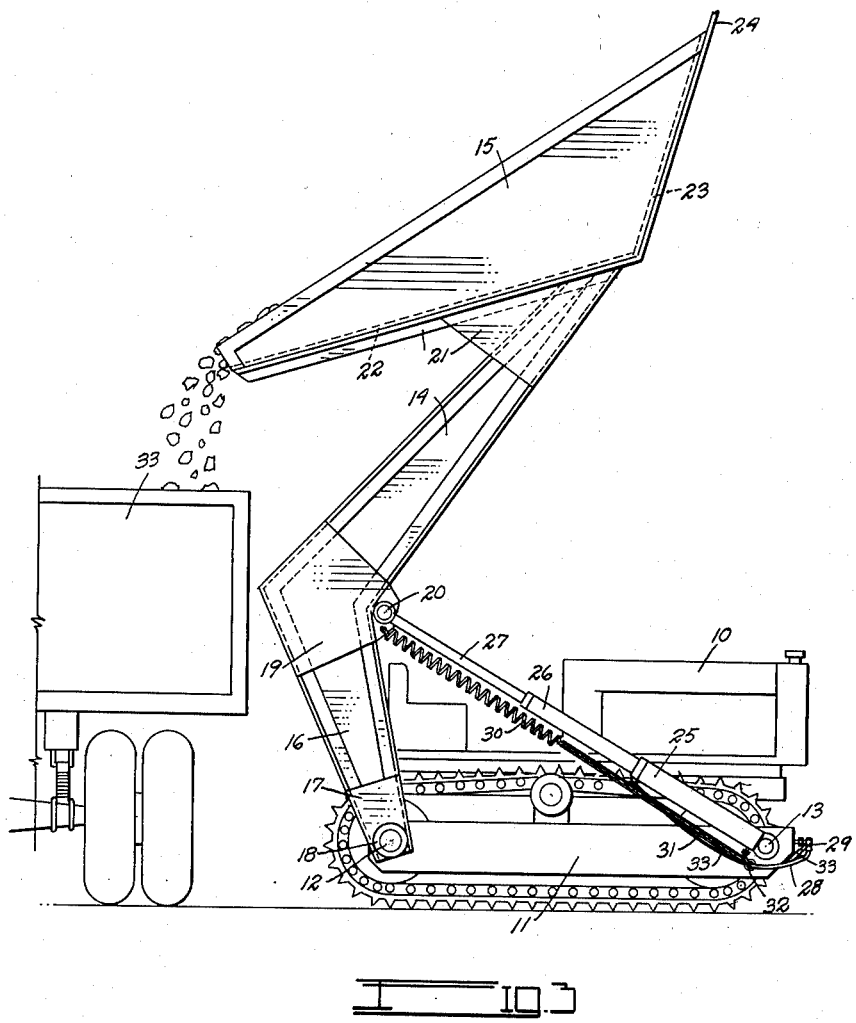
Fig. 3 is a similar view, illustrating the shovel in the load-dumping position.
Figure 4:
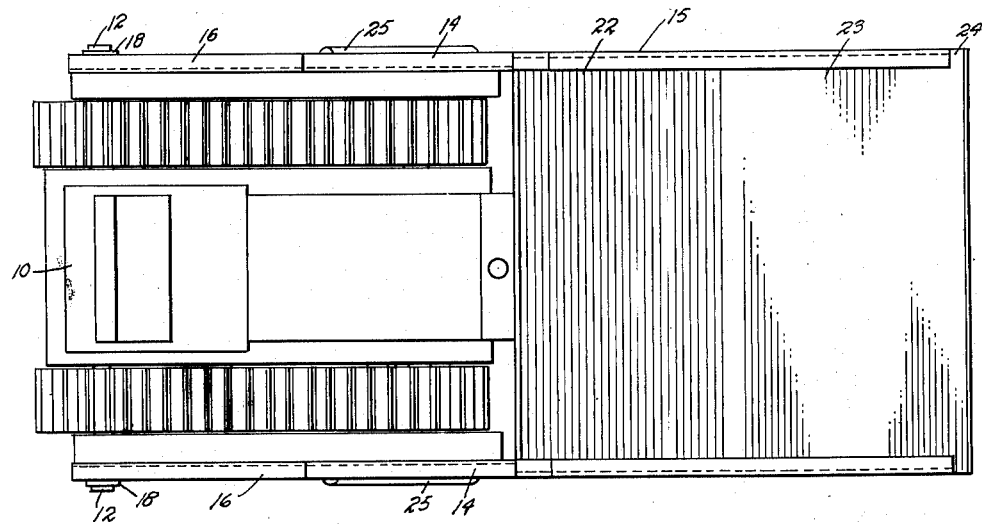
Fig. 4 is a plan view thereof in the loading position.

In Fig. 1 a conventional tractor is illustrated at 10. The improved shovel attachment is mounted on two side frame members 11 designed to be attached along each side of the tractor 10 in any suitable manner. Each side frame member 11 is provided with two projecting stub shafts, a shovel stub shaft 12 positioned adjacent the rear of the frame member, and a hydraulic cylinder shaft 13 positioned adjacent the forward extremity thereof.

The movable portion of the improved shovel consists of a single unitary structure comprising two shovel beams and a shovel 15, all welded or otherwise secured together to form a complete unit. Each shovel beam is somewhat L-shaped, and each comprises a hinged leg portion 16 integrally formed at an angle of approximately 125° to the axis of a shovel arm portion 14 so as to form a bent shovel beam.

The rear extremity of each hinge leg portion 16 is closed by means of a gusset plate 17 which supports a bearing sleeve 18 which is rotatably mounted upon the shovel stub shaft 12. The intersection of the leg portion 16 with the shovel arm 14 is preferably reinforced by means of side gusset plates 19 which extend downwardly to form supporting ears for a hydraulic ram shaft 20. The forward extremities of the shovel arm portions 14 terminate in a supporting frame structure 21 which supports the shovel 15 thereon.

The shovel is formed with a back plate 22 and a bottom plate 23 positioned at an angle of approximately 130° to each other so that when the shovel is in the loading position of Fig. 1, the bottom plate will lie horizontally, while the backing plate 23 inclines rearwardly at an angle of approximately 40° from the vertical. The bottom plate 23 is reinforced by a shovel edge plate 24.

A hydraulic cylinder 25 is hingedly mounted at its forward extremity on each of the cylinder shafts 13. Each of the cylinders 25 carries an inner telescoping cylinder 26 from which a hydraulic plunger 27 projects. Hydraulic fluid is fed to the cylinders 25 through flexible hoses 28 from hydraulic piping 29 leading to any suitable valving and pumping mechanism on the tractor 10.

A tension spring 30 may be attached to the gusset plates 19 at each side of the tractor. The springs 30 terminate in flexible chains 31 connected to spring studs 32 on the frames 11 adjacent the shafts 13.

In use, the shovel is driven forwardly into the pile of material to be loaded, indicated at "A" in Fig. 1. The hydraulic cylinders 25 are then operated to force the upper extremities of the hinge leg portions 16 rearwardly over the shafts 12. This causes the forward extremities of the shovel beams 14 to elevate to the position of Fig. 2. The loaded material rolls back against the back plate 22 and can be transported to any desired position.

For dumping, the tractor is backed up to the dumping point, such as to a truck 33. The cylinders 25 are then further actuated to extend the telescoping inner cylinders and the plungers 27 so as to swing the shovel to the position of Fig. 3, allowing the load to discharge by gravity from the back plate 23 into the truck 33.

In swinging to the dumping position, the weight of the shovel and the shovel arms may swing beyond the vertical plane of the shovel shafts 12. Any suitable means may be provided for returning the shovel to the forward side of this plane so that it may descend by gravity. As illustrated, the springs 30 and the chains 31 will serve this purpose, for as the shovel approaches the dumping position of Fig. 3, the springs 30 will be stretched so that when the hydraulic pressure is relieved in the cylinders 25, the springs will act to pull the shovel toward the position of Fig. 2, from whence it will return to the position of Fig. 1 by gravity.

If desired, the shovel may be returned hydraulically by connecting a hydraulic hose to the upper portion of the cylinder 25 in order to force the pistons therein toward the pivot pin 13.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A tractor shovel comprising a tractor, an elongated substantially horizontal frame member mounted along each side of the lower portion of said tractor, a pivot member projecting outwardly from each frame member adjacent the rear end thereof, a ram-carrying shaft projecting outwardly from each frame member adjacent the front end thereof, a shovel-carrying beam at each side of the tractor pivoted at its rear end to a companion pivot member and extending forwardly at an upward incline for a portion of its length and then at a downward incline for the remainder of its length, the downwardly inclined portions of said beams being of a length adapting them to extend beyond the front end of the tractor to a point adjacent the ground, a shovel carried by and supported between the front ends of the shovel-carrying beams and having a backing plate extending upwardly at a rearward incline over the said beams, a bottom plate secured along the front end of the backing plate and extending horizontally forwardly therefrom, a pivot shaft disposed under each beam transversely thereof at the point where the forwardly and inwardly inclined portion joins the forwardly and downwardly inclined portion thereof, plates carrying the pivot shafts and mounted against side faces of the said beams and constituting reinforcements for the same, a telescoping hydraulic ram pivotally mounted on each ram-carrying shaft and extending rearwardly therefrom at an upward incline and having its rear end pivoted to the pivot shaft adjacent the shovel-carrying beam, the said rams being sufficiently extensible to swing the shovel carrying beams upwardly and rearwardly to an elevated position shifting the backing plate from a rearwardly and upwardly inclined position ahead of the tractor to a rearwardly and downwardly inclined discharging position above and to the rear of the tractor, and means for returning the beams and the shovel to the loading poistion.

SHIRRELL F. BRADFORD.

REFERENCES CITED

The following references are of record in the file of this patent:

UNITED STATES PATENTS

| Number | Name | Date |
| --- | --- | --- |
| 1,285,624 | Clark | Nov. 26, 1918 |
| 2,019,938 | Stephens | Nov. 5, 1935 |
| 2,446,938 | Losch | Aug. 10, 1948 |
| 2,488,699 | Anthony | Nov. 22, 1949 |